United States Patent [19]

Paterson

[11] Patent Number: 5,161,459
[45] Date of Patent: Nov. 10, 1992

[54] PEELING HEAD WITH PEEL STRING GUIDE

[75] Inventor: Douglas F. Paterson, Pueblo, Colo.

[73] Assignee: Atlas Pacific Engineering Company, Pueblo, Colo.

[21] Appl. No.: 827,733

[22] Filed: Jan. 29, 1992

[51] Int. Cl.⁵ .............................................. A23N 7/00
[52] U.S. Cl. ......................................... 99/593; 99/594
[58] Field of Search ................ 99/491, 540, 541, 574, 99/584, 590–599; 426/481, 482, 484

[56] References Cited

U.S. PATENT DOCUMENTS

| | | | |
|---|---|---|---|
| 1,872,731 | 8/1932 | Goranson et al. | 99/593 |
| 3,058,149 | 10/1962 | Schmid et al. | 99/593 |
| 3,058,502 | 10/1962 | Loveland et al. | 99/593 |
| 3,067,791 | 12/1962 | Boyce | 99/593 |
| 3,680,614 | 8/1972 | Polk, Jr. | 99/593 |
| 4,176,594 | 12/1979 | Amstad | 99/591 |
| 4,430,932 | 2/1984 | Tichy et al. | 99/594 |
| 4,771,682 | 9/1988 | Ishikawa | 99/590 |
| 4,972,769 | 11/1990 | Cailliot | 99/541 |
| 5,027,699 | 7/1991 | Paterson et al. | 99/594 |

Primary Examiner—Timothy F. Simone

[57] ABSTRACT

A peeling head is provided for use in a peeling machine wherein a fruit or vegetable (such as an apple or pear) is skewered and rotated about an axis and wherein at least one elongated pivotable shaft housing with a rotary peeling cutter mounted on its distal end articulates to move the rotary peeling cutter around the surface of the fruit or vegetable. The peeling head has a plastic guard carried at the distal end of the shaft housing, and a ceramic tracing shoe insert carried by the plastic guard wherein the ceramic tracing shoe insert has a peel string guide which constantly urges the peel string in the proper direction in order to facilitate breaking of the peel string.

8 Claims, 3 Drawing Sheets

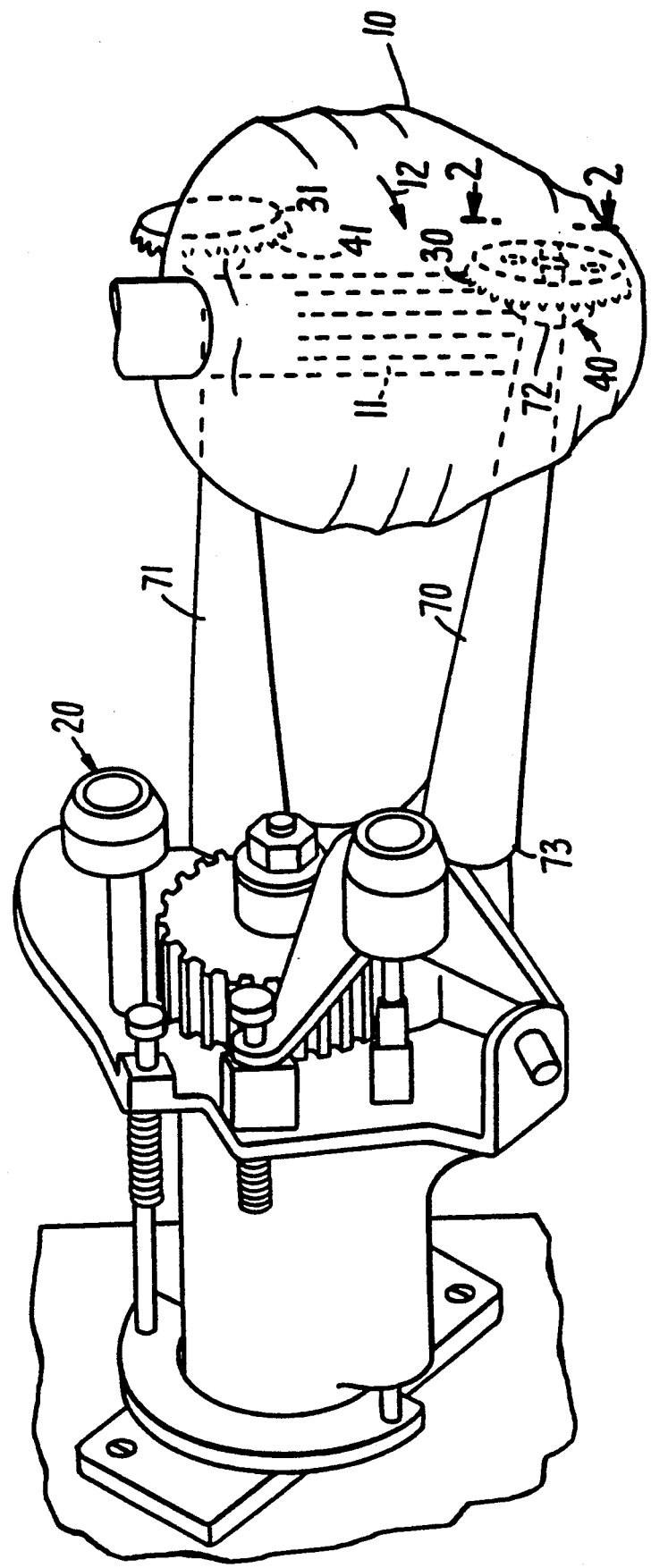

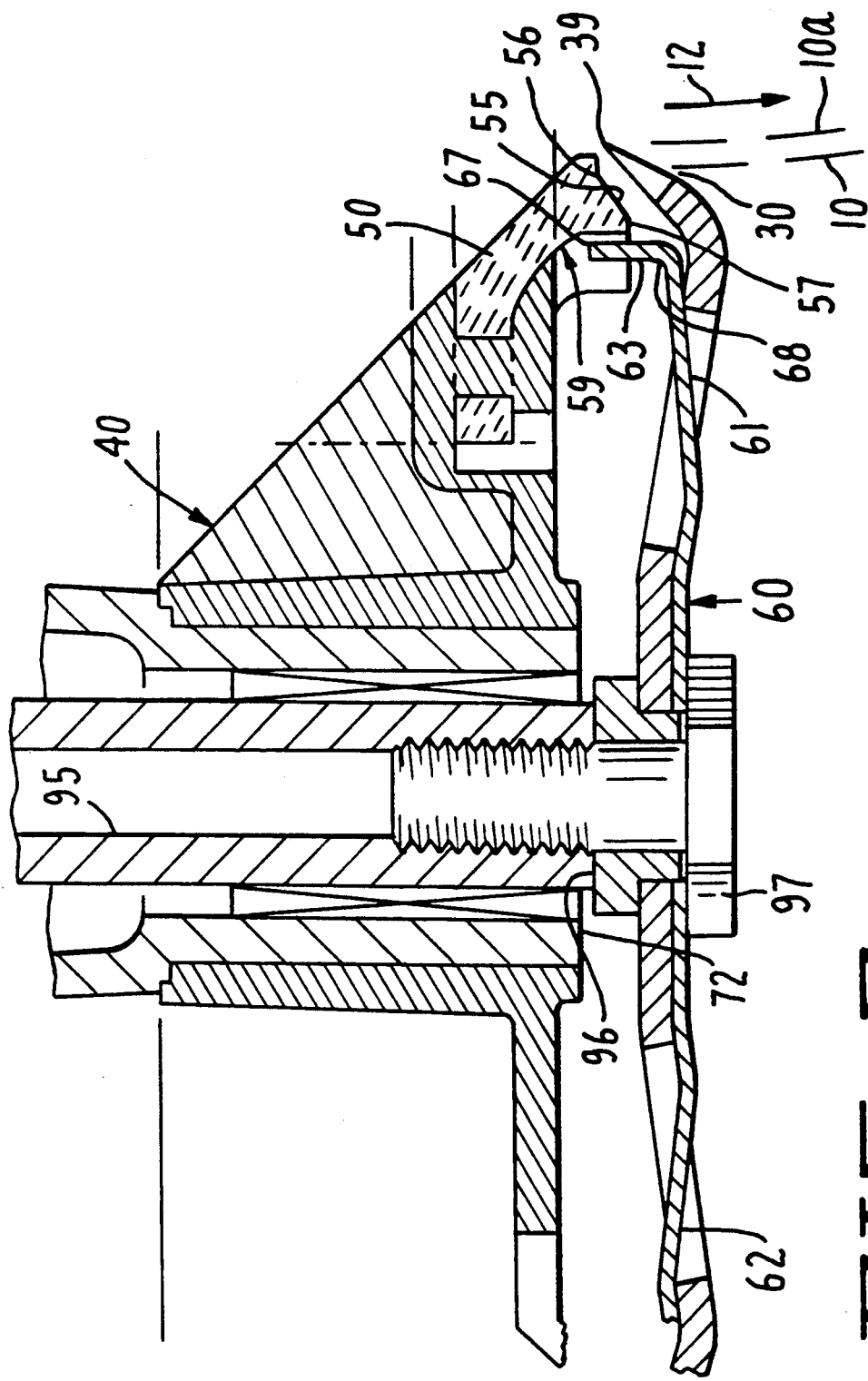

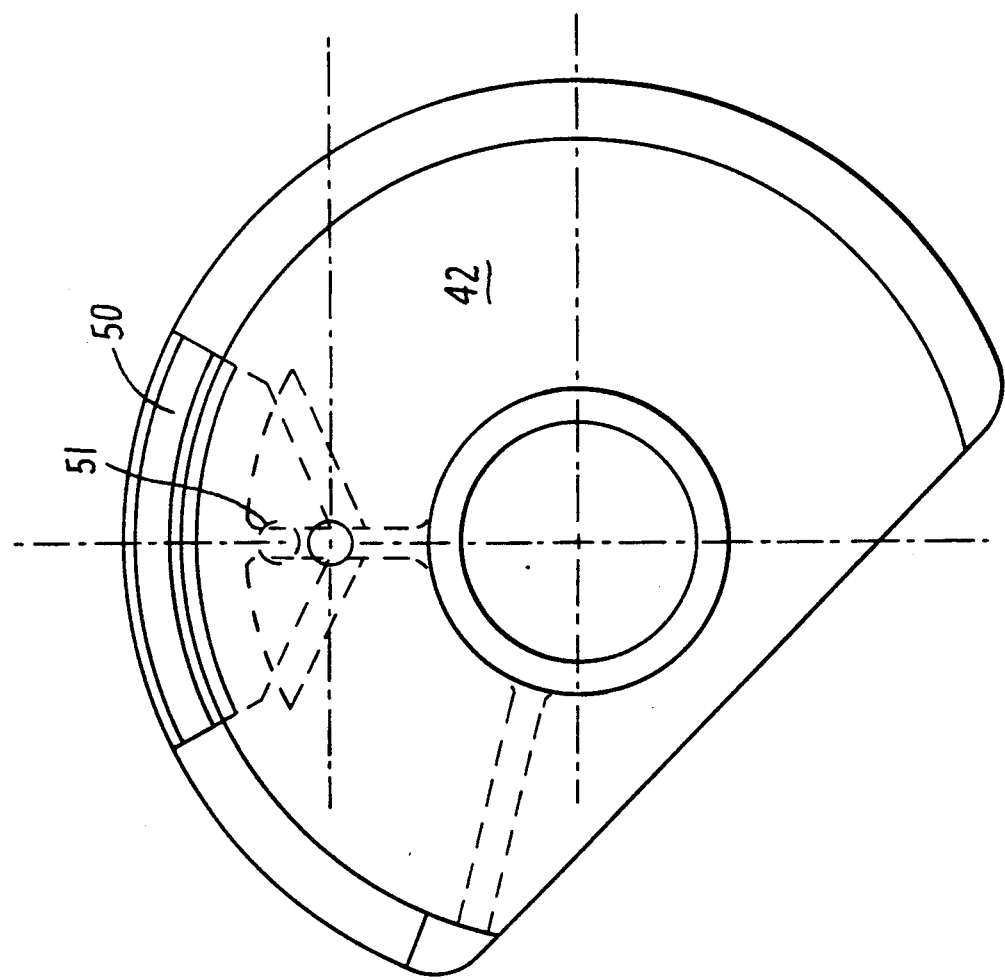

5,161,459

PEELING HEAD WITH PEEL STRING GUIDE

SUMMARY OF THE INVENTION

This invention relates in general to a peeling head for continuously peeling fruit and vegetables, and more particularly to an apple and pear peeling head with a peel string guide to more reliably break or sever the peel string as compared with the mechanisms shown in U.S. Pat. Nos. 5,027,699 and 4,430,932, both owned by the assignee of this invention and this application.

More specifically, this invention utilizes a lightweight plastic guard which in turn carries a ceramic tracing shoe formed therein, and wherein a peel string guide is integrally formed in the ceramic tracing shoe insert. The guide is a conical surface which constantly urges the peel string in the proper direction to facilitate breaking or severing of the peel string and to minimize those instances wherein the peel string jams the cutting mechanism.

A primary object of the present invention is to provide a peeling head for fruits and vegetables with a peel string guide which more reliably severs the peel string and reduces the instances of jamming caused by the peel string.

A further object of the invention is to provide an apple and pear peeling head which is lightweight and which is capable of operating continuously for long periods of time without jamming and which maximizes the yield of usable peeled fruit.

Other objects and advantages of the invention will become apparent from the following description of the preferred embodiment and the drawings wherein:

BRIEF DESCRIPTION OF THE DRAWINGS

FIG. 1 is a perspective view showing the peeling head of the present invention in the process of peeling an apple;

FIG. 2 is a sectional view of the peeling head according to the present invention; and FIG. 3 is a plan view of a portion of the peeling head according to the present invention.

DETAILED DESCRIPTION OF THE DRAWINGS

As shown in FIG. 1, a peeling head mechanism shown generally as 20 is provided which utilizes a pair of rotary cutters 30 and 31 to peel fruit or vegetables such as an apple 10. The following description is of the peeling head being used to peel apples, but the peeling head of this invention may also be used for peeling other fruits (such as pears) and vegetables. Apple 10 is skewered on a vertical three prong (or other) arbor 11 and is rotated about a vertical axis in the direction of arrow 12 at approximately 200-600 rpm. Rotary peeling cutters 30 and 31 are pushed towards the center of apple 10 and are stopped when tracing shoe insert 50 carried by guard 40 (FIG. 2) contacts the skin of apple 10.

For reasons stated in the specification of U.S. Pat. No. 5,027,699, it is desirable to minimize the moment of inertia of the peeling head. As shown in FIG. 1, the basic components of the peeling mechanism are shaft housings 70 and 71, guards 40 and 41 and rotary peeling cutters 30 and 31. As shown best in FIG. 3, guard 40 comprises a plastic guard body 42 and a ceramic wear resistant tracing shoe insert 50. Although the preferred embodiment of the invention utilizes a plastic guard body 42 and a ceramic tracing shoe insert 50, it is within the scope of this invention to use various lightweight materials for these components such as ceramic, metal or plastic.

The primary purpose of the guard 40 is to cooperate with and control the depth of the rotary peeling cutter 30 which in turn controls the yield and quality of the peeled fruit or vegetable. The relationship of the guard 40 to the cutter 30 is the largest single influence on yield during peeling.

As described more fully in U.S. Pat. No. 5,027,699, the ceramic tracing shoe 50 is insert molded in place into guard 40. The ceramic tracing shoe 50 stays in place in the finished part by mechanical binding through a hole or depression 51, as shown in FIG. 3.

As shown in FIG. 2, drive shaft 95 is a hollow shaft made of stainless steel. The distal end 96 of drive shaft 95 carries the cutter 30. Cutter 30 is mounted to drive shaft 95 by threaded bolt 97. Cutter 30 has a cutting tip 39 which is serrated as shown in U.S. Pat. No. 5,027,699. Cutting tip 39 makes contact with apple 10 which is being rotated in the direction of arrow 12. Cutting tip 39 continually generates a peel string (not shown) as the unpeeled portion of said apple upstream of cutting tip 39 (i.e. above tip 39 as shown in FIG. 2) passes through said cutting tip 39, and as the newly peeled portion 10a of apple 10 moves in a direction downstream of cutting tip 39 (i.e. downwardly from tip 39 as shown in FIG. 2).

Drive shaft 95 also carries at its distal end 96 a chip breaker shown generally as 60. The purpose of chip breaker 60 is to break or sever the peel string generated by the cutter. The peel string is generally a long flat string from approximately 12 to 36 inches long. Long stringy peels are a problem in that they tend to build up in clumps and are difficult to remove from the machine. This can cause the machine to plug up. Furthermore, the stringy peels are difficult to deal with once they are out of the machine.

As shown in FIG. 2, chip breaker 60 spins with cutter 30. Chip breaker 60 has a pair of radially extending arms 61 and 62 which extend outwardly from drive shaft 95. The arms 61 and 62 are spring loaded against cutter 30 adjacent the base of cutting tooth 63. FIG. 2 shows only the completed detail of one cutting tooth 63 of chip breaker 60 and the righthand portion of cutting tip 39 of cutter 30. A second tooth is formed on the end of arm 62 and is not shown in FIG. 2. However, the chip breaker can be built with 1,3,4 and as many as 12 teeth. Similarly, the left-hand tip of rotary cutter 30 is not shown in FIG. 2. However, the tooth not shown of chip breaker 60 is similar to tooth 63 and the cutting tip 39 of cutter 30 extends a full 360° as shown best in FIG. 1.

Tooth 63 of chip breaker 60 has a positive rake angle and a positive attack angle as described in U.S. Pat. No. 5,027,699. However, the chip breaker of the present invention differs from that shown in U.S. Pat. No. 5,027,699 in that the upper tip 67 of tooth 63 extends upwardly into a cavity 59 formed by ceramic tracing shoe insert 50 and peel string guide means 55.

The primary difference between the peeling head of this invention and the peeling heads shown in U.S. Pat. Nos. 5,027,699 and 4,430,932 (both owned by the assignee of this invention and application) resides in the relationship of the ceramic tracing shoe insert 50, the rotary cutter 30 and the chip breaker 60 as shown in FIG. 2. According to the present invention, ceramic tracing shoe insert has a peel string guide means 55 which extends in the downstream direction of motion of apple 10 as it moves past cutting tip 39. This direction is shown generally by arrow 12 of FIG. 2. Guide means 55 extends in this downstream direction beyond cutting tip 39. Peel string guide means 55 comprises a conical surface having a base portion 56 upstream of cutting tip 39, the base being integrally molded with ceramic tracing shoe insert 50 and an apex 57 which extends in the downstream direction past cutting tip 39. The effect of having peel string guide means 55 formed, as shown in FIG. 2 and described above, is to continuously urge the peel string (not shown) in a direction towards the base 68 of tooth 63 to more reliably sever the peel string and to reduce the chance of the peel string flexing and avoiding being severed by tooth 63. The apex 57 of peel string guide means 55 extends downwardly in FIG. 2 parallel to shaft 95, past cutting tip 39 and past the tip 67 of chip breaker tooth 63. This feature assures that the peel string is reliably severed by the teeth of chip breaker 60 and thereby minimizes the opportunity for the peel string to become tangled in the mechanism. Although the peel string guide means 55 is preferably integrally molded with ceramic tracing shoe 50, it may be made of different material and attached to the lower portion of tracing shoe 50. As indicated above, the peel string guide means 55, tracing shoe 50 and guard body 42 may be all made of the same lightweight material such as ceramic, plastic or metal, or various combinations of those materials.

The shaft housings 70 and 71 use substantially the same design as described in U.S. Pat. No. 5,027,699. The yoke and drive mechanisms of the present invention are also as described in U.S. Pat. No. 5,027,699.

What is claimed is:

1. In a peeling machine wherein a fruit or vegetable is skewered and rotated in a certain direction about an axis, wherein at least one elongated pivotable shaft housing with a rotary peeling cutter mounted on its distal end articulates to move said rotary peeling cutter around the surface of said fruit or vegetable, said rotary peeling cutter having a cutting tip which contacts said fruit or vegetable, and wherein a guard mounted on the shaft housing cooperates with the cutter for determining the depth of cut made by the cutter, and wherein a peel string is continually generated by said cutting tip as the unpeeled portion of said fruit or vegetable upstream of said cutting tip passes through said cutting tip, and as the newly peeled portion of said fruit or vegetable moves in a direction downstream of said cutting tip, the improvement comprising:

a peel string guide means carried by said guard and extending in said downstream direction of motion of said fruit or vegetable, and extending in said direction beyond the cutting tip of said peeling cutter to urge said peel string in said direction to facilitate breaking of said peel string, and chip breaker means mounted on the distal end of said drive shaft for periodically breaking said peel string.

2. The apparatus of claim 1 wherein said peel string guide means comprises a conical surface wherein the base of said conical surface is upstream of said cutting tip and the apex of said conical surface extends downstream past said cutting tip.

3. The apparatus of claim 1 for use in peeling apples and wherein said chip breaker means has two breaker tips.

4. The apparatus of claim 1 for use in peeling pears.

5. In a peeling machine wherein a fruit or vegetable is skewered and rotated in a certain direction about an axis, wherein at least one elongated pivotable shaft housing with a rotary peeling cutter mounted on its distal end articulates to move said rotary peeling cutter around the surface of said fruit or vegetable, wherein said rotary peeling cutter has a cutting tip which contacts said fruit or vegetable, and wherein a peel string is continually generated by said cutting tip as the unpeeled portion of said fruit or vegetable upstream of said cutting tip passes through said cutting tip, and as the newly peeled portion of said fruit or vegetable moves in a direction downstream of said cutting tip, the improvement comprising:

a plastic guard carried at the distal end of said shaft housing, a ceramic tracing shoe insert carried by said plastic guard, said ceramic tracing shoe insert having a peel string guide surface extending in said downstream direction of motion of said fruit or vegetable, and extending in said direction beyond the cutting tip of said peeling cutter, whereby said peel string guide surface of said tracing shoe insert urges said peel in said direction to facilitate breaking of said peel string.

6. The apparatus of claim 5 further comprising a chip breaker means carried by the distal end of said drive shaft for periodically breaking said peel string, wherein said chip breaker means has a breaker tip, and wherein said peel string guide surface extends past said breaker tip in said downstream direction of motion of said fruit or vegetable.

7. The apparatus of claim 6 for use in peeling apples.

8. The apparatus of claim 6 for use in peeling pears.

* * * * *